United States Patent
Telfer et al.

(10) Patent No.: US 12,539,069 B2
(45) Date of Patent: Feb. 3, 2026

(54) METHOD AND APPARATUS FOR WEARABLE DEVICE WITH EEG AND BIOMETRIC SENSORS

(71) Applicant: Sens.ai Inc., Whistler (CA)

(72) Inventors: Paola Telfer, Whistler (CA); Corey Julihn, Surrey (CA)

( * ) Notice: Subject to any disclaimer, the term of this patent is extended or adjusted under 35 U.S.C. 154(b) by 177 days.

(21) Appl. No.: 16/482,659

(22) PCT Filed: May 27, 2019

(86) PCT No.: PCT/IB2019/054388
§ 371 (c)(1),
(2) Date: Dec. 5, 2019

(87) PCT Pub. No.: WO2019/229636
PCT Pub. Date: Dec. 5, 2019

(65) Prior Publication Data
US 2021/0353957 A1    Nov. 18, 2021

Related U.S. Application Data

(60) Provisional application No. 62/757,485, filed on Nov. 8, 2018, provisional application No. 62/762,982, filed on May 26, 2018.

(51) Int. Cl.
*A61N 5/06* (2006.01)
*A61B 5/00* (2006.01)
(Continued)

(52) U.S. Cl.
CPC ........ *A61N 5/0618* (2013.01); *A61B 5/02055* (2013.01); *A61B 5/021* (2013.01);
(Continued)

(58) Field of Classification Search
CPC .......... A61N 5/0618; A61N 2005/0626; A61N 2005/0647; A61N 2005/0659;
(Continued)

(56) References Cited

U.S. PATENT DOCUMENTS

2017/0365101 A1* 12/2017 Samec .................. G06T 19/006

FOREIGN PATENT DOCUMENTS

| FR | 3058628 A1 * | 5/2018 | ............. A61B 5/369 |
| KR | 20170129117 | * 11/2017 | |
| WO | WO-2017062752 A1 * | 4/2017 | ............. A61B 5/021 |

* cited by examiner

Primary Examiner — Carl H Layno
Assistant Examiner — Aya Ziad Bakkar
(74) Attorney, Agent, or Firm — Julian D. Forman

(57) ABSTRACT

Devices and methods for monitoring, stimulating, and entraining electrical activity generated by the brain of a person are provided. Electroencephalography (EEG) and photobiomodulation (PBM) devices in the form of headphones for monitoring, stimulating, and entraining electrical activity generated by a person's brain are described, along with methods for monitoring and stimulating a person's cognitive and physiological state using the provided devices. PBM light is pulsed to stimulate an increase in targeted brainwave frequencies through entrainment and providing additional energy to mitochondria. PBM stimulation is combined with EEG sensors and neurofeedback. The neurofeedback may be used to assist users with stress, anxiety, fatigue, mood, creativity and mental focus and acuity.

5 Claims, 3 Drawing Sheets

(51) Int. Cl.
*A61B 5/0205* (2006.01)
*A61B 5/021* (2006.01)
*A61B 5/256* (2021.01)
*A61B 5/291* (2021.01)
*A61B 5/375* (2021.01)

(52) U.S. Cl.
CPC .............. *A61B 5/256* (2021.01); *A61B 5/291* (2021.01); *A61B 5/375* (2021.01); *A61B 5/7203* (2013.01); *A61B 2562/0271* (2013.01); *A61N 2005/0626* (2013.01); *A61N 2005/0647* (2013.01); *A61N 2005/0659* (2013.01); *A61N 2005/0662* (2013.01)

(58) Field of Classification Search
CPC ........................ A61N 2005/0662; A61B 5/291; A61B 5/375; A61B 5/256; A61B 5/02055; A61B 5/021; A61B 2562/0271
See application file for complete search history.

METHOD AND APPARATUS FOR WEARABLE DEVICE WITH EEG AND BIOMETRIC SENSORS

CROSS-REFERENCE TO RELATED APPLICATIONS

This is a U.S. National Stage of International Application PCT/IB2019/054388, filed May 27, 2019, which claims the benefit of U.S. Provisional Application No. 62/762,982, filed May 26, 2018 and U.S. Provisional Application No. 62/757,485, filed Nov. 8, 2018.

FIELD OF THE INVENTION

The present invention relates to devices and methods for monitoring, stimulating, and entraining electrical activity generated by the brain of a person. Specifically, the invention provides electroencephalography (EEG) and photobiomodulation (PBM) devices for monitoring and stimulating electrical activity generated by a person's brain. Also described are methods for monitoring and stimulating a person's cognitive and physiological state using the provided devices. The invention provides for the pulsing of PBM light to stimulate an increase in targeted brainwave frequencies and providing additional energy to mitochondria. PBM stimulation is combined with EEG sensors and neurofeedback.

BACKGROUND OF THE INVENTION

Neurostimulation is the purposeful modulation of the nervous system's activity. Traditionally this has been done through direct electrical stimulation via:
  tMS—Transcranial magnetic stimulation
  tACS—Transcranial Alternating Current Stimulation
  tRNS—Transcranial Random Noise Stimulation
  tDCS—Transcranial Direct Current Stimulation The process of neurofeedback involves measuring the nervous system's activity using electroencephalography (EEG) sensors, processing and filtering those signals, and then augmenting or inhibiting the person's nervous system activity with visual, audio, or other forms of feedback.

Neurofeedback and neurostimulation have historically not been practicable in combination as the stimulation current directly interferes with EEG sensors. Accordingly, up until now, the current inventors are unaware of these disciplines being combined in a single device or method, and they have only been approached separately from each other. As a result, neurofeedback protocols and neurostimulation protocols have been researched and developed to work independently of each other.

Photobiomodulation (PBM) therapy is the use of non-ionizing photonic energy to create photochemical changes inside cellular structures usually mitochondria. This technique has primarily been used to reduce pain and inflammation, and speed the healing process of damaged tissue.

Recently, Photobiomodulation have been shown to photostimulate brain cytochrome oxidase activity. According to F. Gonzalez-Lima and Douglas W. Barrett (2014): "The way that near-infrared lasers and light-emitting diodes (LEDs) interact with brain function is based on bioenergetics, a mechanism that is fundamentally different than that of other brain stimulation methods such as electric and magnetic stimulation . . . . If an effective near-infrared light energy dose is supplied, it stimulates brain ATP production (Lapchak and De Taboada, 2010) and blood flow (Uozumi et al., 2010), thereby fueling ATP-dependent membrane ion pumps, leading to greater membrane stability and resistance to depolarization, which has been shown to transiently reduce neuronal excitability (Konstantinovic et al., 2013). On the other hand, electromagnetic stimulation directly changes the electrical excitability of neurons."

The present invention pulses PBM light at targeted frequencies stimulating an increase in the corresponding brainwave frequencies via entrainment and providing additional energy to mitochondria at targeted locations. The invention also combines PBM stimulation with electroencephalography (EEG) sensors, and neurofeedback. This allows for a novel joint application of neurofeedback, biofeedback, and neurostimulation protocols.

SUMMARY OF THE INVENTION

The present invention provides a wearable headphone set that incorporates embedded biometric sensors. Data collected from the sensors provide data patterns that are analyzed, and a biometric feedback loop is created by adjusting the audio signal and in some scenarios, a visual signal, as well. This feedback loop may be used to assist users with stress, anxiety, fatigue, mood, creativity and mental focus and acuity. Additionally, it can be used for physiological synchrony between people. The present invention balances readings from a combination of these biometrics to achieve cognitive improvements, "depth" of meditation, "emotional resilience" or improved family, work or sports "team" dynamics and performance.

The Biometric data include but are not limited to: EEG (electroencephalography), heart rate variability (HRV), pulse oximeter, blood oxygen level (SPO2), respiratory rate, blood pressure, and body temperature. The present invention utilizes biometrics such as heart rate, heart rate variability, blood oxygen levels, body temperature, breathing rate, and blood pressure, as well as additional EEG sensor locations.

Electrodes are located at Cz, Fz, Pz, P3 and P4 as per the 10 20 Brain Mapping Standard. The device also includes a mechanism to clip in attachments which can expand the number of electrode locations and provide alternative electrode locations.

BRIEF DESCRIPTION OF THE DRAWINGS

The invention will be better understood according to the following detailed description of several embodiments with reference to the attached drawings, in which.

DETAILED DESCRIPTION OF THE INVENTION

Figure 1:
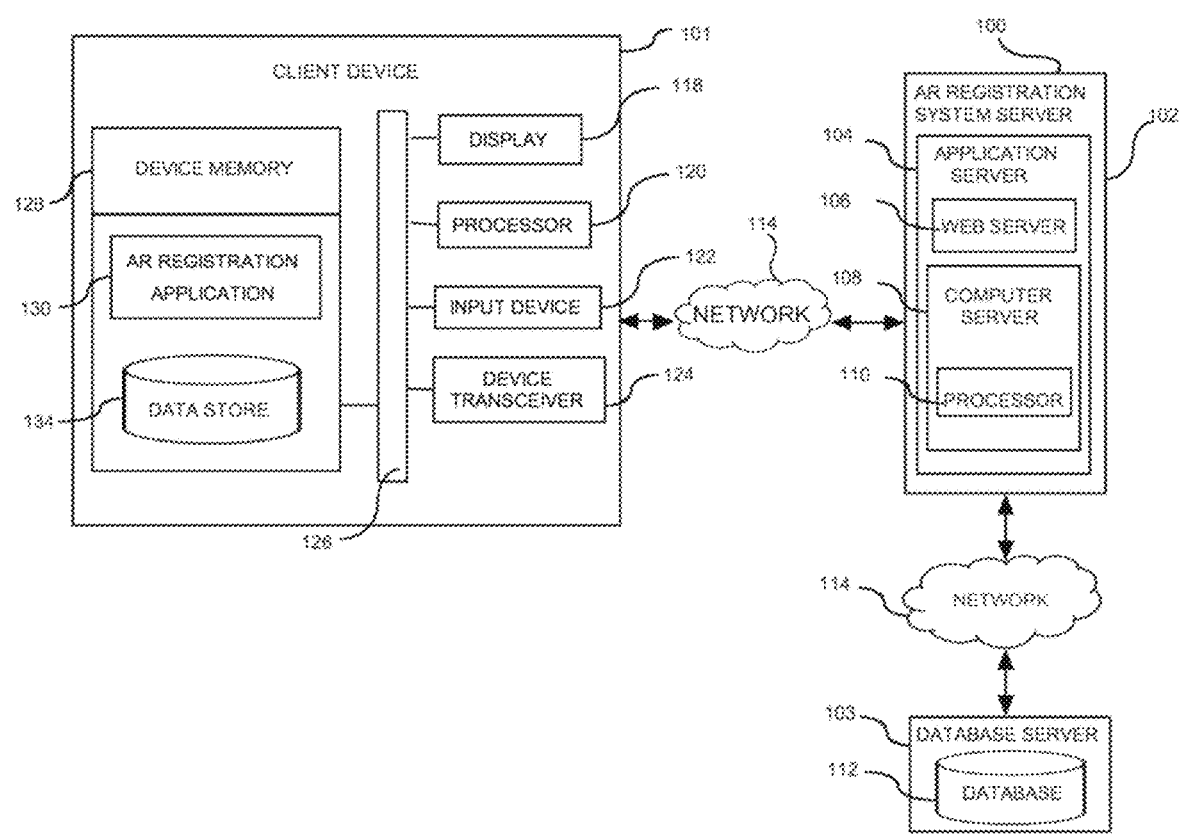
FIG. 1 presents an exemplary system architecture for connecting a wearable device to remote resources according to an embodiment of the present invention.

In one aspect, the present invention provides EEG and a pulse oximeter in headphones. In an embodiment, the headphones of the present invention combine EEG (Electroencephalography) with heart rate variability (HRV) or pulse oximeter in headphone form factor and in algorithms. In an embodiment, a pulse oximeter is incorporated inside an over-ear headphone design which reduces ambient noise allowing for increased accuracy.

The present invention provides a wearable headphone set with embedded biometric sensors that collect physiological signals from the user. The device includes Bluetooth (wireless) audio and data transmission, a rechargeable battery, speakers, microphone, and active noise cancellation (ANC).

Electrodes are used to collect EEG signals. Electrodes are placed at C3, CZ, C4, PZ, and FZ locations according to the International 10-20 system and may include reference or ground electrodes at A1 or A2.

Pulse oximeters are used to collect additional biometrics. Photo plethysmography (PPG) is an optical measurement of the absorption of specific wavelengths of light by the body. A pulse oximeter containing LEDs and photosensors is placed inside one of the earpieces and positioned against the outer ear. The pulse oximeter will use a reflectance method for measurement. Placing the pulse oximeter inside the earpiece which covers the ear, reduces signal noise from ambient light.

The pulse oximeter data is converted into the following biometric signals (but not limited to these): heart rate (pulse), heart rate variability, respiratory rate, blood pressure, blood oxygen level (SPO2), and hydration level. In an embodiment, one or more temperature sensors are used to collect body temperature signals. Multiple sensors may be required to capture the external temperature as well to increase the accuracy of the body temperature measurement. Other Sensors include acceleration, magnetometer, gyroscope, barometer/pressure, and audio/voice sensors.

In another embodiment the device utilized EKG or ECG signals to establish heart rate and heart rate variability (HRV).

Biometric Feedback Calibration

Heart rate variability (HRV) is unique to everyone. To use HRV as an indicator for stress, fatigue, focus, etc., HRV needs to be based on a value relative to each person. An embodiment of the present invention utilizes a two-part calibration method. In the first part, the user relaxes with their eyes closed for approximately 30-90 seconds while breathing in and out at a pace set by audio prompts. For the second part the user opens their eyes and holds their breath for 15 to 30 seconds. This data is used to establish a baseline for HRV both in a relaxed state and in a stressed state.

Establishing baseline and normal range values for an individual user's biometric feedback will be done through a calibration process. During the calibration process biometric signals will be captured and processed by the device and transmitted a mobile device and then to a cloud server for additional processing. The calibration process requires the user to execute physical activities, answer questions, and/or play short games. These exercises are designed to push the user's biometric signals up and or down to establish a baseline or normal range specific to the user.

Example Breathing Activity: In the first part the user relaxes with their eyes closed for 30 seconds while breathing in and out at a pace set by audio prompts. For the second part the user opens their eyes and holds their breath for 15 to 30 seconds. This data is used to establish a baseline for HRV and other biometric signals both in a relaxed state and in a stressed state.

Usage of Biometric Feedback

Embodiments of the present invention utilize a combination of biometric data, EEG, heart rate (pulse), heart rate variability, body temperature and blood oxygen (SPO2) levels to adjust audio and visuals (neurofeedback and biofeedback), to reduce stress, increase focus, or alert the user to their level of fatigue or stress. Target applications include (1) flow states (increased focus/concentration), (2) stress reduction, (3) improved mood, (4) pain management, (5) sleep improvement, (6) deepening of meditative altered states and (7) staving cognitive decline. The form factor is the same for all. But the software algorithms differ and, in embodiments, are subscription based.

The biometric signals are processed on the headphone device, as well as transmitted to a mobile device, and a cloud-based server for additional processing. After processing, feedback is given to the user through adjusting the sound on the headphones, notifications, charts, graphs, etc. on their mobile device, and through audio prompts including sounds and verbal instructions. There may also be other physical feedback methods such as vibration or light patterns. The feedback will be tailored to the individual user based on their calibrated baseline (see above).

Feedback Process

The device detects specific conditions and automatically adjusts feedback. The headphones device of the present invention performs the following feedback functions: Reading the user's current biometric levels; Set target levels based on the current level and the calibrated baselines; Adjust the audio and/or visuals as biofeedback "rewarding" the user as they move toward the progressive target levels; Monitoring the user's current level and comparing it to the calibrated baselines, the target and adjusting the feedback "reward."

Adaptive Feedback with Stimulation

Another technique of the present invention combines adaptive feedback with photobiomodulation. The device establishes overall baseline biometrics for a wearer based on EEG (electroencephalography) and heart rate variability (HRV) and may incorporate additional biometric signals including blood oxygen level (SPO2), respiratory rate, blood pressure, and body temperature. Baselines are established and dynamically adjusted through (1) calibration activities, (2) historical data, (3) the current feedback session biometric data, and or (4) supplemental survey data collected by the system.

A feedback protocol is selected either by the wearer or by the system based on the baseline data. The protocol sets and adapts target biometric levels throughout the feedback session based on the baselines and the wearers current biometric levels. As the wearer's biometric levels move toward or away from the target, they are rewarded or inhibited with visual, audio, or other forms of feedback.

In this technique the biometric feedback is supplemented with biometric stimulation. In one embodiment this is achieved through pulsed photobiomodulation at the same locations as the EEG electrodes. Pulsing red or near infrared light at specific frequencies will stimulate an increase in targeted brainwave frequencies via entrainment and provide additional energy to mitochondria at the targeted locations. Further, the effect of the biometric stimulation can be measured and incorporated back into the biometric feedback protocols.

Photobiomodulation

Inside mitochondria, cytochrome oxidase has the ability to absorb red and near infrared light and convert it into energy adenosine triphosphate (ADT).

The device transmits light is at a wavelength between 600 and 1150 nanometers with 810 nm being the ideal wavelength due to its ability to penetrate further into biological tissue.

The inventive devices and methods pulse photobiomodulation light at specific frequencies stimulating an increase in targeted brainwave frequencies via entrainment and providing additional energy to mitochondria at targeted locations.

In other embodiments the invention may utilize additional or alternate forms of stimulation including but not limited to:
 tACS—Transcranial Alternating Current Stimulation
 tRNS—Transcranial Random Noise Stimulation
 tDCS—Transcranial Direct Current Stimulation
Binaural Beats In yet another embodiment Auditory Beat Stimulation (ABS) is used in conjunction with adaptive feedback and photobiomodulation stimulation. Binaural beats are generated when two audio sine waves are presented within a close frequency to each other to each ear separately. The difference in frequencies (eg. 12 Hz) is perceived as a beat and subjectively is perceived to be "located" inside the head. Again, this auditory stimulation can impact brainwaves, and this stimulation can be measured and feedback into the biometric feedback protocols.
Heart Rate Variability (HRV)

Heart rate variability (HRV) has been shown to have direct correlations to stress reactions. In the present invention HRV may be also used to adapt the feedback amount and target, session length, protocol selection, and also to switch from feedback into stimulation mode, or a combined mode.

In another technique HRV feedback and breathing rate feedback is used in conjunction with the adaptive feedback and stimulation. This can enhance the effectiveness of the feedback protocols as well as have an impact on the wearer's stress and emotional resilience. HRV and breathings rate feedback can be done at the start or end of a protocol session or during the session both independently or in combination with the overall protocol feedback signals.
Biometric Sync In another embodiment the two or more devices are able to enter a biometric sync mode in which biofeedback signals are synchronized across multiple devices and wearers in order to bring the wearers to similar physiological synchrony levels. This could include but not limited to heart rate variability (HRV), body temperature, breathing rate, eeg, or other biometric signals.

Biometric Targets: At a simple level the biometric targets are calculated signal levels based on the user's current level and their personal calibration data. By reaching the target level it would be expected that the user would have a specific benefit such as improved focus/concentration, stress reduction, improved mood, better pain management and or deeper sleep. As an example, two small vibration motors may be included in the left and right ear piece of the headphones device and fed HRV and EEG signals. The user may learn to interpret this new data.
TAG Biometric Feedback In one example of a biometric feedback protocol the present invention may train, reward, and stimulate a sequence of increases in alpha brainwaves (8-12 Hz), theta brainwaves (4-7 Hz), and/or gamma (40-100 Hz) brainwaves. In this embodiment, the device will provide the wearer feedback to reward increases in alpha waves at the P3 and P4 locations also rewarding synchrony or coherence between these sites. The device will also reward increases in theta frequencies at the Cz and Fz locations including synchrony or coherence. Finally, the protocol will reward increases in gamma frequencies at sites Pz, Fz, Cz, P3, and P4. This feedback protocol may be implemented with adaptive feedback and stimulation. It will train alpha exclusively, or alpha-theta or theta-gamma or alpha-gamma or theta-alpha-gamma (TAG) jointly.

The present invention applies a theta, alpha, gamma synchrony algorithm to induce deep meditative states, train in relaxed concentration, and hone out-of-box thinking on a Consumer Wearable.
SMR Feedback Another example of a feedback protocol implemented by the present invention rewards and stimulates increases in SMR brainwaves (12-15 Hz) at one or more of the following sites: Cz, C3, and or C4.
Slow Cortical Potential Feedback Another example of a feedback protocol implemented by the present invention rewards and stimulates in infra-low brainwaves or slow cortical potentials at one or more of the following sites: T3/T4, Fp1, P4.

The present invention may also prompt the wearer with questions through a connected device such as a smartphone or tablet which may be used to refine the targeted frequency within the 12 to 15 Hz range. Questions could include topics such as level of engagement, headaches, feelings of alertness or tiredness, etc.
Digital Prescriptions The device is capable of providing digital prescriptions. In the scenario a medical diagnosis is provided by a trained clinician, doctor, or from biometric data on the device itself. Diagnoses could include ADHD, depression, anxiety, etc.

The doctor, or device then prescribes a treatment protocol. The prescription is stored on the server and the user or patient may access the prescribed treatment protocol on the device where the device enters a biometric feedback sequence as described by the treatment protocol. The device is able to monitor the patient's adherence to the protocol, and the results of the treatment and report this data back to the source of the prescription. Further, these digital prescriptions are restricted to users who have been prescribed access.

FIG. 1 illustrates an exemplary system architecture for connecting the headphones device to remote resources by connecting the headphones device to a public communications network to a remotely-operated server that provides additional processing, storage, and transactional functions for the headphones device and users thereof.

FIG. 1 illustrates the general architecture of a client-server application system 100 that operates in accordance with embodiments of the present invention. In a preferred embodiment, system 100 is implemented in multi-tier or n-tier architecture with one or more client devices 101 residing at the client tier, one or more servers 102 in the middle or server application tier and one or more database servers 103 residing in the database tier. In the above variant of three-tier architecture the client, the first tier, may have to only perform the user interface i.e., validate inputs; in which case the middle tier holds all the backend logic and does data processing while the data server, the third tier, performs data validation and controls the database access.

One or more client devices 101 are connected to system server 102 via a network 114. The system server 102 communicates with the client devices 101 over the network 114 to present a user interface or graphical user interface (GUI) for the service system 100 of the present invention. The user interface of the service system 100 of the present invention can be presented through a web browser or through a mobile application communicating with the system server 102 and is used for displaying, entering, publishing, and/or managing data required for the service. As used herein, the term "network" generally refers to any collection of distinct networks working together to appear as a single network to a user. The term also refers to the so-called world wide "network of networks" or Internet which is connected to each other using the Internet protocol (IP) and other similar protocols. As described herein, the exemplary public network 114 of FIG. 1 is for descriptive purposes only and it may be wired or wireless.

Although the description may refer to terms commonly used in describing public networks such as the Internet, the description and concepts equally apply to other public and private computer networks, including systems having architectures dissimilar to that shown in FIG. 1. The inventive idea of the present invention is applicable for all existing cellular network topologies or respective communication standards, such as GSM, UMTS/HSPA, LTE and the like.

With respect to the present description, the system server 102 may include any service that relies on a database system that is accessible over a network, in which various elements of hardware and software of the database system may be shared by one or more users of the system 100. To this end, the users of the client device 101, from which a request or instruction is received over a network 114, may include any individual customer, a governmental or non-governmental organization, a group etc. The GUI or user interface provided by the system server 102 on the client devices 101 through a web browser or mobile app may be utilized by the users for utilizing service system 100.

The components appearing in system server 102 refer to an exemplary combination of those components that would need to be assembled to create the infrastructure to provide the tools and services contemplated by the present invention. As will be apparent to one skilled in the relevant art(s), all of components "inside" of system server 102 may be connected and may communicate via a wide or local area network (WAN or LAN).

The system server 102 includes an application server or executing unit 104. The application server or executing unit 104 comprises a web server 106 and a computer server 108 that serves as the application layer of the present invention. The Web server 106 is a system that sends out Web pages containing electronic data files in response to Hypertext Transfer Protocol (HTTP) requests from remote browsers (i.e. browsers installed in the client devices 101) or in response to similar requests made through a mobile app or mobile application of the present invention installed on a client device 101. The web server 106 can communicate with the mobile app of the present invention and/or with a web browser installed on a client device 101 to provide the user interface required for the service.

The computer server 108 may include a processor 110, a random-access memory (RAM) (not shown in figures) for temporary storage of information, and a read only memory (ROM) (not shown in figures) for permanent storage of information. Computer server 108 may be generally controlled and coordinated by operating system software. The operating system controls allocation of system resources and performs tasks such as processing, scheduling, memory management, networking, and I/O services, among (other) things. Thus, the operating system resides in system memory and, on being executed by CPU, coordinates the operation of the other elements of AR server 102.

Although the description of the computer server 108 may refer to terms commonly used in describing computer servers, the description and concepts equally apply to other processing systems, including systems having architectures dissimilar to that shown in FIG. 1.

The database tier is the source of data where at least one database server 103 generally interfaces multiple databases 112. Those databases are frequently updated by their users and administrators most often through a combination of private and public networks 114 including the Internet. It would be obvious to any person skilled in the art that, although described herein as the data being stored in a single database, different separate databases can also store the various data and files of multiple users.

A mobile application, or "app," is a computer program that may be downloaded and installed in client device 101 using methods known in the art. Hereinafter, the mobile app 130 is referred to as app 130. App 130, custom built for the present invention, enables one or more persons to do various tasks related to live, in-person translation services using the system of the present invention. The activities related to the service of the present invention can also be performed using the user interface (or GUI) presented through a client device-based web browser. Hereinafter, the term "user interface" is used to refer to both app user interface and the web browser user interface of the present invention. Examples of client device 101 may include, but not limited to, mobile devices, tablets, hand-held or laptop devices, smart phones, personal digital assistants, desktop computers, wearable devices, augmented reality glasses, virtual reality headsets, or any similar device.

As illustrated in FIG. 1, the client device 101 may include various electronic components known in the art for this type of device. In this embodiment, the client device 101 may include a device display 118, a computer processor 120, a user input device 122 (e.g., touch screen, keyboard, microphone, and/or other form of input device known in the art), a device transceiver 124 for communication, a device memory 128, the AR app 130 operably installed in the computer memory 128, a local data store 134 also installed in the device memory 128, and a data bus 126 interconnecting the aforementioned components. For purposes of this application, the term "transceiver" is defined to include any form of transmitter and/or receiver known in the art, for cellular, WIFI, radio, and/or other form of wireless or wired communication known in the art. Obviously, these elements may vary, or may include alternatives known in the art, and such alternative embodiments should be considered within the scope of the claimed invention.

Figure 2:
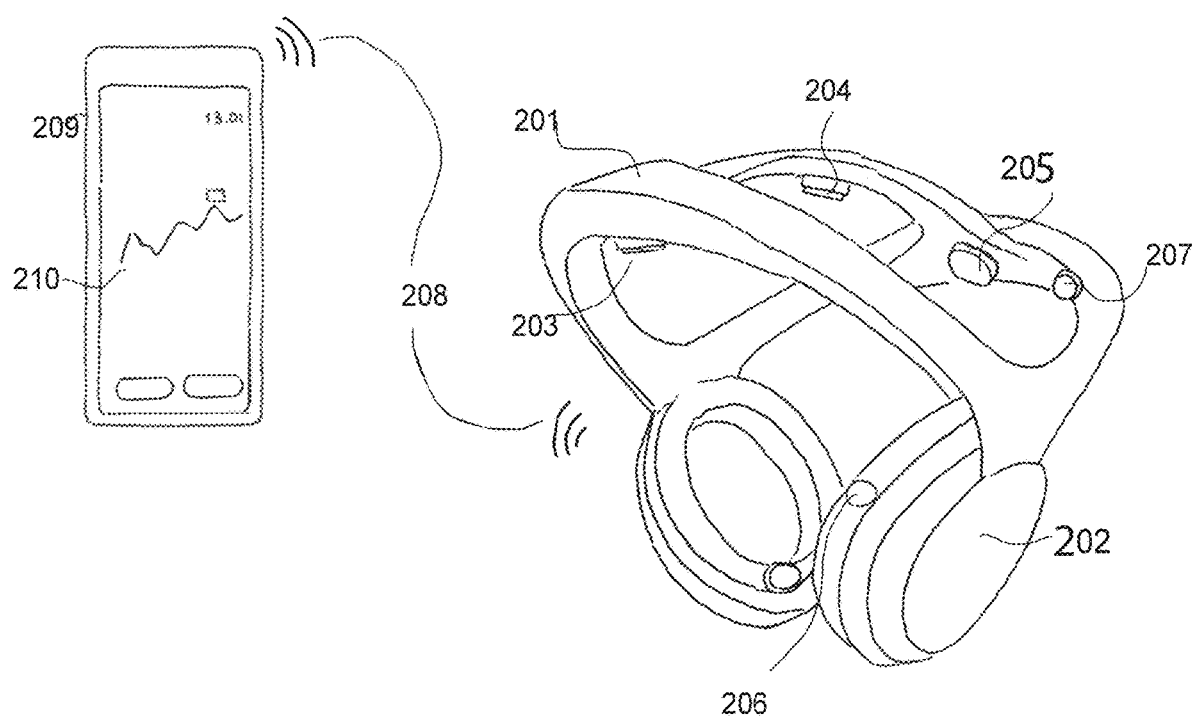
FIG. 2 presents a wearable device in accordance with an embodiment of the present invention.

FIG. 2 presents an example of a wearable device in accordance with an embodiment of the present invention. Wearable device 201 may include one or more EEG sensors 203, 204, 205, a PBM stimulator 207, an additional biometric sensor 206 and a modality for auditory feedback 202. The wearable device may be in wireless communication 208 with a mobile device 209 and the screen of the mobile device may serve as a modality for visual feedback 210.

Figure 3:
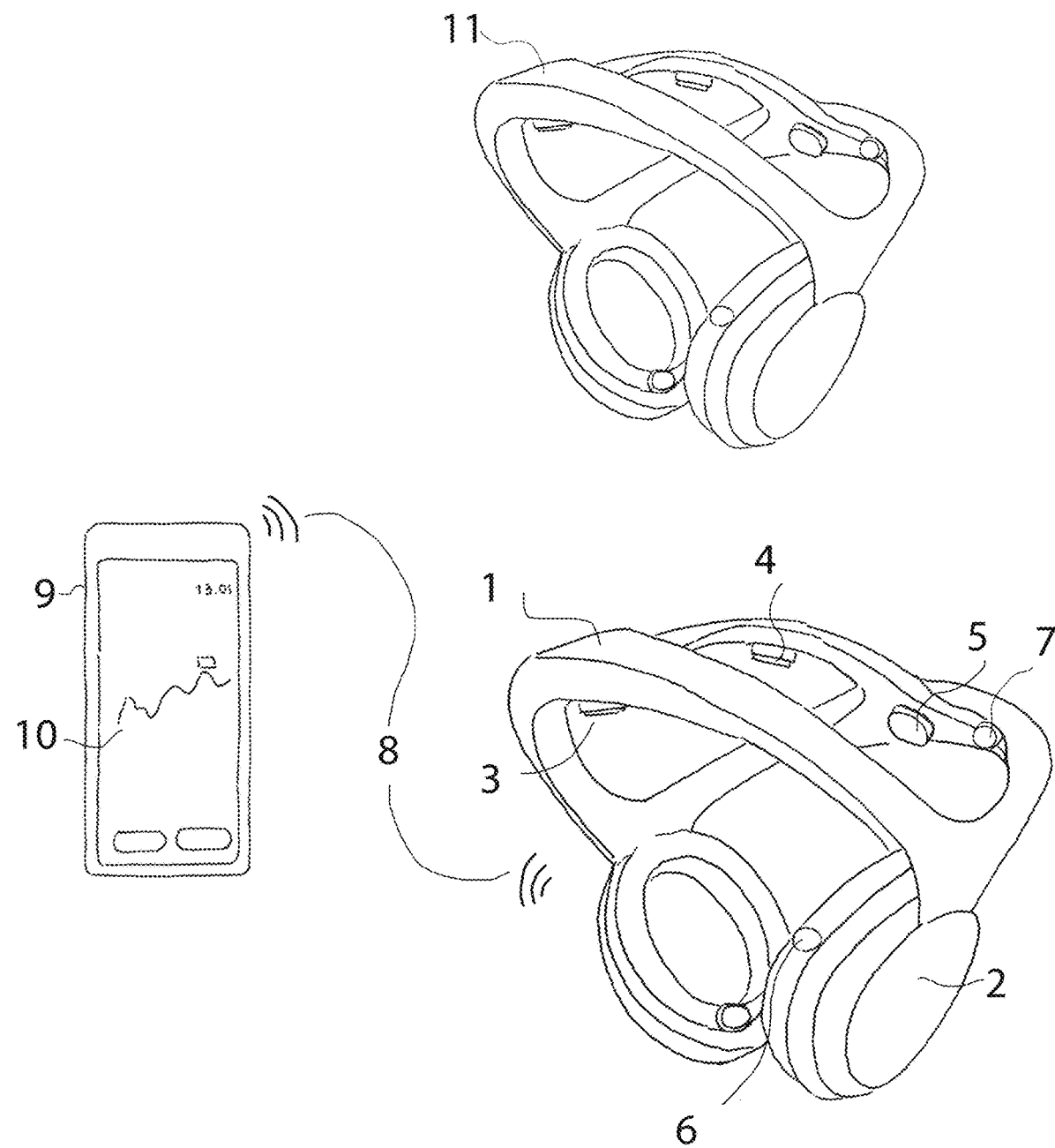
FIG. 3 presents a wearable device in and a second wearable device in accordance with an embodiment of the present invention.

FIG. 3 presents an example of a wearable device along with a second wearable device in accordance with an embodiment of the present invention. Wearable device 1 may include one or more EEG sensors 3, 4, 5, a PBM stimulator 7, an additional biometric sensor 6 and a modality for auditory feedback 2. The wearable device may be in wireless communication 8 with a mobile device 9 and the screen of the mobile device may serve as a modality for visual feedback 10. The wearable device 1 may be part of a system with a second wearable device 11 wherein each of the wearable device 1 and the second wearable device 11 may provide biosensing, biostimulation and feedback modalities according to the various embodiments of the present invention.

Alternative embodiments included, but are not in any way limited to, integration of the neurofeedback and neurostimulation modalities of the present invention into other suitable wearable devices besides headphones. One of skill in the art will understand that such alternative embodiments are possible as long as stimulation and measurement is possible to the appropriate regions of a wearer's brain. One of skill in the art will also understand that application of other known PBM and EEG protocols would be possible within the scope of the current invention. The working examples provided herein are illustrative in nature and are not intended to limit the scope of the disclosure.

What is claimed is:

1. A system for monitoring, stimulating, and training electrical activity generated by a brain of a human, comprising:
    a wearable device comprising:
        at least one electroencephalogram (EEG) sensor;
        at least one other biometric sensor; and
        at least one photobiomodulation (PBM) stimulator;
    wherein the wearable device receives biometric measurements from the at least one EEG sensor and the at least one other biometric sensor and causes the at least one PBM stimulator to provide pulsed near-infrared light to the brain of the human, wherein the pulsed near-infrared light is modulated to alter measured biometric parameters of the human; and
    wherein the wearable device further comprises one or both of a modality for providing visual feedback and a modality for providing auditory feedback, and wherein the wearable device, upon receiving the biometric measurements from the at least one EEG sensor and the at least one other biometric sensor, causes one or both of the modality for providing visual feedback and the modality for providing auditory feedback to provide one or both of visual and auditory feedback modulated to alter the measured biometric parameters of the human; and
    wherein the wearable device is configured to establish the received biometric measurements as baseline biometric levels and to further establish target biometric feedback levels; and
    wherein the wearable device is configured to modulate the pulsed near-infrared light provided by the PBM stimulator and the one or both of the visual and auditory feedback so as to alter the biometric parameters of the human; and
    wherein the wearable device is further configured to establish a feedback loop by receiving data of biometric parameters from the at least one EEG sensor and the at least one other biometric sensor and, on the basis of the data of biometric parameters, further modulating the pulsed near-infrared light provided by the PBM stimulator and the one or both of the visual and auditory feedback so as to further alter the biometric parameters of the human; and
    wherein the wearable device is further configured to modulate the pulsed near-infrared light provided by the PBM stimulator and the one or both of the visual and auditory feedback by modulating one or more of frequency, duration, interval, duty cycle, location, and intensity; and
    wherein the target biometric feedback levels are modulated through one or more of calibration activities, individual or group historical data, and feedback session biometric data; and
    further comprising a mobile application for collecting biometric data from the wearable device and delivering programs to the wearable device for providing PBM stimulation and one or both of visual feedback and auditory feedback; and
    wherein the system further comprises at least one other wearable device comprising at least one EEG sensor, at least one other biometric sensor, at least one PBM stimulator, a modality for providing visual feedback and a modality for providing auditory feedback, wherein the at least one other wearable device is configured to receive the biometric measurements from the at least one EEG sensor and the at least one other biometric sensor and is configured to establish the received biometric measurements as baseline biometric levels of at least one other human wearer and to further establish target biometric levels of the at least one other human wearer that are synchronized with the target biometric levels of the human.

2. The system of claim 1, wherein the at least one other biometric sensor comprises a pulse oximeter, and wherein the pulse oximeter is positioned against an ear of the human.

3. The system of claim 2, wherein the at least one PBM stimulator provides the pulsed near-infrared light at the same locations as the at least one EEG sensor.

4. A system for monitoring, stimulating, and training electrical activity generated by a brain of a human, comprising:
    a wearable device comprising:
        at least one electroencephalogram (EEG) sensor;
        at least one other biometric sensor; and
        at least one photobiomodulation (PBM) stimulator;
    wherein the wearable device receives biometric measurements from the at least one EEG sensor and the at least one other biometric sensor and causes the at least one PBM stimulator to provide pulsed near-infrared light to the brain of the human, wherein the pulsed near-infrared light is modulated to alter measured biometric parameters of the human, and
    wherein the at least one PBM stimulator provides the pulsed near-infrared light at the same locations as the at least one EEG sensor; and
    wherein the wearable device further comprises one or both of a modality for providing visual feedback and a modality for providing auditory feedback, and wherein the wearable device, upon receiving the biometric measurements from the at least one EEG sensor and the at least one other biometric sensor, causes one or both of the modality for providing visual feedback and the modality for providing auditory feedback to provide one or both of visual and auditory feedback modulated to alter the measured biometric parameters of the human; and
    wherein the wearable device is configured to establish the received biometric measurements as baseline biometric levels and to further establish target biometric feedback levels; and
    wherein the wearable device is configured to modulate the pulsed near-infrared light provided by the PBM stimulator and the one or both of the visual and auditory feedback so as to alter the biometric parameters of the human; and
    wherein the wearable device is further configured to establish a feedback loop by receiving data of biometric parameters from the at least one EEG sensor and the at least one other biometric sensor and, on the basis of the data of biometric parameters, further modulating the pulsed near-infrared light provided by the PBM stimulator and the one or both of the visual and auditory feedback so as to further alter the biometric parameters of the human; and wherein the wearable device is further configured to modulate the pulsed near-infrared light provided by the PBM stimulator and the one or both of the visual and auditory feedback by modulating one or more of frequency, duration, interval, duty cycle, location, and intensity; and wherein the target biometric feedback levels are modulated through one or more of calibration activities, individual or group historical data, and feedback session biometric data; and further comprising a mobile application for collecting biometric data from the wearable device and delivering programs to the wearable device for providing PBM stimulation and one or both of visual feedback and auditory feedback; and wherein the system further comprises at least one other wearable device comprising at least one EEG sensor, at least one other biometric sensor, at least one PBM stimulator, a modality for providing visual feedback and a modality for providing auditory feedback, wherein the at least one other wearable device is configured to receive the biometric measurements from the at least one EEG sensor and the at least one other biometric sensor and is configured to establish the received biometric measurements as baseline biometric levels of at least one other human wearer and to further establish target biometric levels of the at least one other human wearer that are synchronized with the target biometric levels of the human.

5. The system of claim 4, wherein the at least one other biometric sensor comprises a pulse oximeter, and wherein the pulse oximeter is positioned against an ear of the human.

* * * * *